Figure 1:
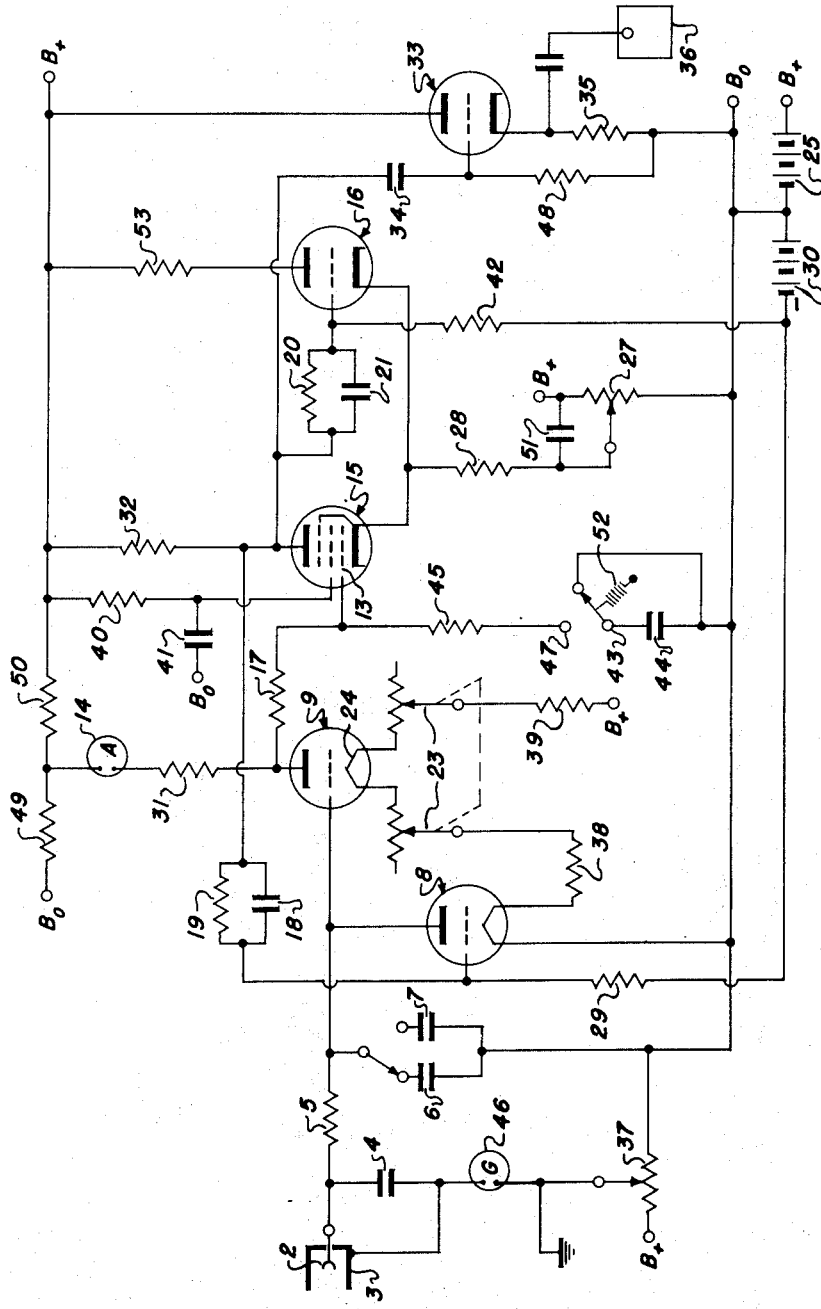

Oct. 21, 1952　　　　　　　C. J. BROWN　　　　　　2,615,063
CURRENT MEASURING DEVICE

Filed Nov. 10, 1950　　　　　　　　　　　　　　　2 SHEETS—SHEET 1

WITNESSES:
Ralph Carlisle Smith
Henry Hayman

INVENTOR:
Clarence J. Brown
BY
Roland A. Anderson
Attorney

Patented Oct. 21, 1952

2,615,063

UNITED STATES PATENT OFFICE 2,615,063

CURRENT MEASURING DEVICE

Clarence J. Brown, Los Alamos, N. Mex., assignor to the United States of America as represented by the United States Atomic Energy Commission Application November 10, 1950, Serial No. 195,086

2 Claims. (Cl. 171—95)

This invention relates broadly to a current measuring device for measuring minute electric currents and, more particularly, it is directed to a current measuring device for measuring the target current of ion accelerators.

The target current of ion accelerators, such as the cyclotron, is minute and commonly has a magnitude which varies in value between $10^{-5}$ to $10^{-9}$ amperes. In addition, the current created by the impingement of positive ions on a target may be erratic and discontinuous. It follows that the direct measurement of such a minute and variable current is not feasible with satisfactory accuracy by conventional types of current measuring instruments for reasons either of lack of sensitivity or susceptibility to current leakage.

The problem of measuring minute currents such as that created by the impingement of positive ions is solved in the present invention by the use of an integrating circuit which includes a capacitor of selected size which is discharged or dumped upon each accumulation therein of a selected charge. Each discharge of the capacitor represents a definite amount of integrated current and each discharge is recorded on a visible indicating recorder.

It is therefore an object of this invention to provide a method and apparatus for measuring minute electric currents.

It is a further object of this invention to provide a current measuring device which is capable of accurately measuring currents of the order of magnitude in the range of $10^{-5}$ to $10^{-9}$ amperes.

It is still another object of this invention to provide a current measuring device which translates precise current quantities into counts and accurately records or indicates the counts for a selected interval of time.

It is still another object of this invention to provide a device for measuring minute currents in which the deleterious effect of leakages is minimized.

Other objects and advantages of the present invention will become apparent as this specification proceeds with reference to the drawing made a part hereof.

Figure 1 of the drawing is a diagram showing schematically a preferred form of current measuring device which embodies the principles of this invention.

Figure 2:
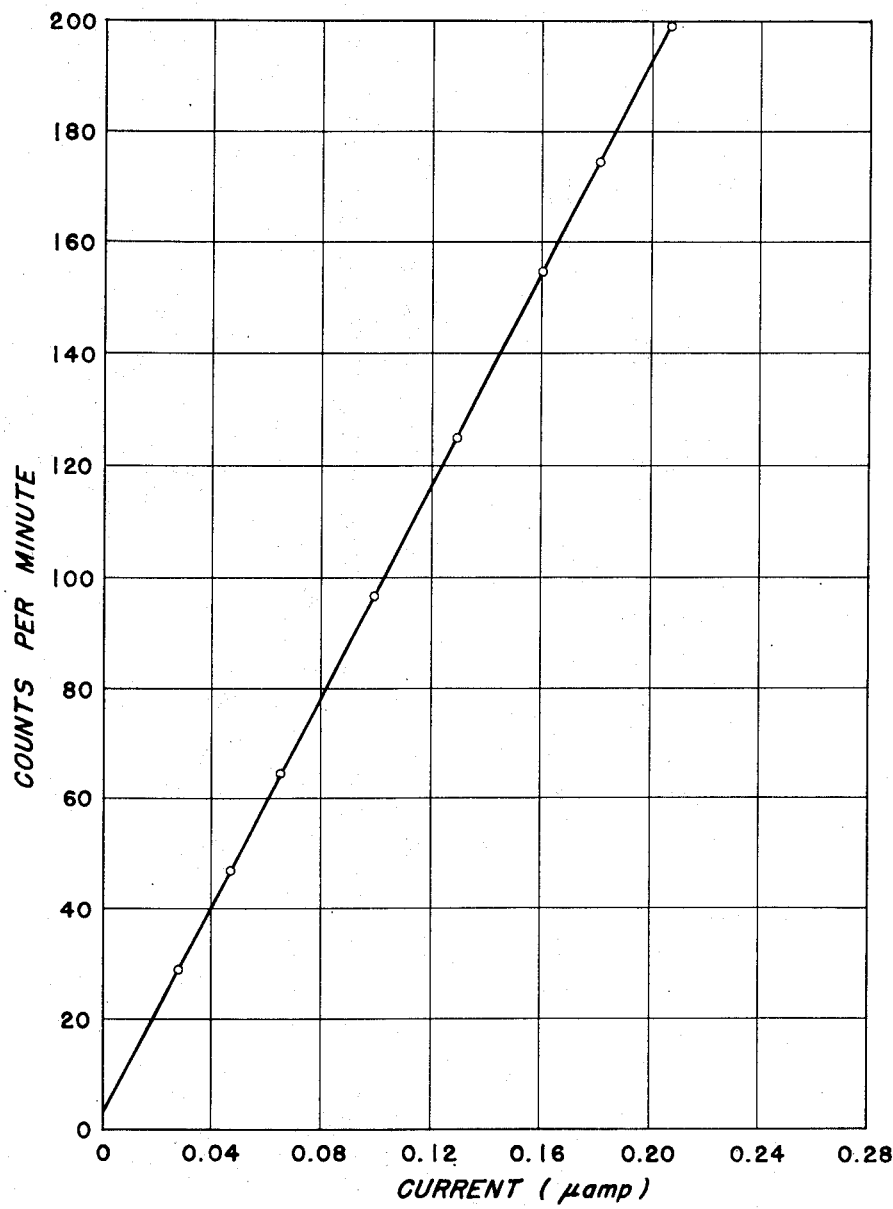

Figure 2 is a chart showing the relation of current magnitude to recorded counts for a preferred embodiment of the invention.

The device of this invention comprises essentially three parts in combination. These parts are, a current integrator in which the current being measured charges a capacitor, a trigger circuit arranged to discharge the capacitor upon the attainment thereacross of a selected potential, and a recording or indicating device for registering the number of discharges.

The current measuring device for use in the ascertainment of minute current quantities must have certain characteristics of precise behavior. For example, the trigger circuit must have very close voltage stability in its triggering characteristics. In addition, the input circuits of the device must be well insulated to avoid leakages. To the end that these and other requirements are met, the device of this invention includes certain novel arrangements which will become apparent as the description proceeds.

Referring to the drawing, the target or collector for ions is indicated by reference numeral 2. The housing or grounded cage of the ion-producing device is indicated by reference numeral 3. The input potential therefrom is impressed across a capacitor 4 which acts to reduce fluctuations of the potential of the target without otherwise affecting the operation of the circuit. In series with the junction of the target and capacitor 4 is connected a resistor 5 of high value which is followed by shunt capacitor 6 of precise selected value. The resistor 5 is for the purpose of rendering the calibration of the circuit independent of the capacitance of the target and connecting cables. Connected in shunt across capacitor 6 is a first vacuum tube 8 which acts as a switch to discharge the capacitor when activated by a suitable positive pulse on its grid. To this end, a control tube and trigger circuit are provided. The control tube 9 is connected with its grid and cathode effectively across the capacitor 6. The anode of tube 9 is connected through a load resistance and anode current measuring device 14 to a selected value of anode potential.

In order to obtain an abrupt discharge of capacitor 6, the trigger circuit comprising tubes 15 and 16 is responsive to the anode potential of tube 9. The grid 13 of first trigger tube 15 is connected through resistor 17 to the anode of tube 9 and the anode of first trigger tube 15 is coupled through network 18—19 to the grid of tube 8.

Tubes 15 and 16 are connected in a trigger circuit of the flip-flop variety having one condition of stability. To this end, the grid of tube 16 is connected to the anode of the first trigger tube 15 through a network consisting of resistor 20 and capacitor 21. The threshold of sensitivity or discriminator action of the trigger circuit is obtained by means of bias adjusting potentiometer rheostat 27, the slider of which is connected to the cathodes of the trigger tubes through resistor 28. The operation of the circuit thus far described is as follows:

Initially, tube 8 is provided with a cut-off bias by means of grid leak 29 and grid bias source 30. Tube 9 is initially provided with a selected negative bias by means of the dual potentiometer 23 which connects the filament 24 to a source of filament energization.

The input current accumulating in capacitor 6 causes the grid potential of tube 9 to rise. As the grid potential rises in a positive direction, the anode of tube 9 undergoes a large decrease in potential due to the voltage drop in anode resistor 31. The anode of tube 9 is direct-current coupled to the grid of trigger circuit first tube 15. Tube 15 is selected from a type having sharp cut-off characteristics so that little change takes place in the anode potential of tube 15 until the grid potential decreases to a value close to cut-off. Upon the occurrence of this value of grid potential, the anode potential increases sharply due to the decrease in potential drop across anode resistor 32. This positive excursion in potential of the anode of tube 15 is impressed on the grid of trigger circuit second tube 16. An increase in current through tube 16 results, thereby causing an increased voltage drop across cathode resistor 28 which, in turn, increases the bias on trigger tube 15 thereby creating a regenerative effect which quickly cuts off tube 15.

To the end that the triggering action of the trigger circuit will discharge or dump storage capacitor 6, the sharp positive excursion of the anode of tube 15 is impressed on the grid of tube 8 and sharply decreases the resistance of tube 8 so that capacitor 6 is short-circuited and thereby discharged. The discharge of capacitor 6 to a selected low value requires a finite interval of time which is obtained by the provision for requisite delay in the return of the flip-flop circuit to its initial state. This is accomplished by the direct coupling of the grid of tube 15 to the anode of tube 9 with the result that the potential on the grid of tube 15 is depressed by the anode potential of tube 9 so long as capacitor 6 contains a charge above a selected critical value.

The value of capacitor 6 and the selected values of bias on tubes 9 and 15 determine one cycle of operation for a precise amount of charge in capacitor 6. Each cycle of operation of the trigger circuit therefore represents a known quantity of current and, to the end that an indication is made, tube 33 and recorder 36 are provided. Tube 33 is of the grid-controlled variety with the grid coupled through coupling condenser 34 to the anode of first trigger tube 15. Tube 33 is provided with a load resistor 35 in its cathode circuit and to the cathode, recorder 36 is coupled. The change is anode potential of tube 15 which occurs each time the trigger circuit is energized is coupled to tube 33 thereby resulting in a pulse at the cathode of tube 33 which, in turn, actuates the recorder 36.

The device of the type herein described depends for its usefulness on very low values of leakage and, to this end, the zero voltage power supply lead denoted by Bo is not at ground potential. This unipotential lead is connected to ground and to the cage 3 of the ion collector by the slider on potentiometer rheostat 37. One end of the rheostat resistor 37 is connected to the positive pole of the anode potential source. This circuity minimizes the effect of secondary electron emission and stray ion leakage and, in addition, eliminates the need for more than one high voltage power supply. In addition, in the connection of the slider to ground, a galvanometer type instrument 46 is serially connected and, since this instrument provides the return path for the input current into the current measuring device, it reads the mean input current.

It has been found that the current measuring device herein described is linear in behavior and accurate within 1 per cent if the maximum repetition rate for discharging the capacitor 6 is less than $\frac{1}{100}t$ wherein the term $t$ is the time required for discharge of the capacitor. It follows that the range of the instrument can be increased by the provision of additional capacitors such as capacitor 7, having a value of capacitance different from that of capacitor 6 by a selected amount.

In order to avoid an inaccurate indication due to an initial state of charge on capacitor 6 at the beginning of a measuring time interval, means are provided for actuating the trigger circuit to discharge capacitor 6. To this end, a reset switch 43, capacitor 44, and resistor 45 are serially connected in the grid circuit of tube 15. The circuit is re-set by connecting the capacitor 44 to the switch point 47. This results in the sharp decrease of the potential on grid 13 thereby causing the trigger circuit to cycle and discharge capacitor 6. Switch 43, when not actuated, is coerced by spring 52 to return to its normal position, short-circuiting capacitor 44 and thus readying to reset circuit for later use. The reset switch utilizes capicitor 44 in order that the effect of throwing the reset switch will be only momentary and result in any one cycle of the trigger circuit. Consequently, an unknown number of counts on the recorder is avoided even though the reset switch is manipulated for an indefinite interval.

The values of the components in a refined instrument such as described supra are, in certain instances, critical and, to the end that the practical application of the teachings herein set forth will be facilitated, the following values of components for the preferred embodiment are presented.

*Tubes*

| | |
|---|---|
| 8 and 9 | Victoreen VX-32 |
| 15 | 6SH7 |
| 16, 33 | 6SN7 |

*Capacitors*

| | | |
|---|---|---|
| 4 | microfarads | 0.1 |
| 6 | do | 0.01 |
| 7 | do | 0.1 |
| 18, 21 | micro-microfarads | 50 |
| 34 | microfarads | 0.1 |
| 41 | do | 8 |
| 44 | do | 0.003 |
| 51 | do | 0.03 |

*Potentiometer rheostats*

| | |
|---|---|
| 23 | Dual 500 ohms |
| 27 | 5 kilohms |
| 37 | 25 kilohms |

Resistors

| | | |
|---|---|---|
| 5 | megohms | 10 |
| 17, 29 | do | 1 |
| 19 | do | 1.5 |
| 20, 42 | kilohms | 220 |
| 28 | ohms | 560 |
| 31 | megohms | 2 |
| 32, 40, 53 | kilohms | 20 |
| 35 | do | 10 |
| 38 | ohms | 700 |
| 39 | kilohms | 4.3 |
| 45 | do | 2 |
| 48 | do | 470 |
| 49 | do | 9 |
| 50 | do | 56 |

Potential sources

| | Volts |
|---|---|
| 25 | 300 |
| 30 | 150 |

Figure 2 is a chart showing the relationship between the input current and the recorded counts per minute for the device of this invention having values for its components in accordance with the above table. Although the specification has stressed the application of this invention to the measurement of ion beam current, it is apparent that the device of the invention is not limited to this use, but is applicable to the measurement of minute currents whatever the source.

In addition, it is apparent that although the salient features of this invention have been described in detail with respect to one embodiment, other numerous modifications may be made within the spirit and scope of this invention. Accordingly, the invention is to be considered limited in scope only by the limitations of the appended claims in view of the prior art.

What is claimed is:

1. A device for measuring minute electrical currents comprising an integrating network including a shunt capacitor, a control vacuum tube having at least a filamentary cathode, grid and anode, means electrically connecting the grid-cathode inter-electrode space in shunt with said capacitor, a flip-flop circuit comprising a first and a second grid-controlled thermionic tube, said flip-flop circuit first thermionic tube having a sharp cut-off characteristic and having the grid directly connected to the control tube anode, a grid-controlled switch tube having a filamentary cathode, grid and anode, and having the cathode-anode interelectrode space connected in shunt with said capacitor, means electrically connecting the filamentary cathodes of the control tube and the switch tube in series with each other and a source of filament potential, means direct-current coupling the switch tube grid with the anode of the flip-flop circuit first tube, means connected to the flip-flop circuit for recording each activation thereof, said flip-flop circuit first tube being normally conducting, whereby an accumulating charge in said capacitor with polarity positive with respect to the control tube cathode causes a decrease in current in the flip-flop circuit first tube, rapid transference of conduction to the second tube and impression of a positive impulse on the switch tube control grid to thereby discharge the capacitor, and the direct coupling between the anode of the control tube and the flip-flop first tube grid inhibits the return to the original state of the flip-flop circuit until the capacitor is discharged to a selected value.

2. The device of claim 1 in which a resistor, a normally open switch and a second capacitor are serially connected together and effectively connected across the grid-cathode interelectrode space of the flip-flop circuit first tube, whereby closure of the switch activates the flip-flop circuit and discharges the capacitor.

CLARENCE J. BROWN.

REFERENCES CITED

The following references are of record in the file of this patent:

UNITED STATES PATENTS

| Number | Name | Date |
|---|---|---|
| 2,491,904 | Poole | Dec. 20, 1949 |